United States Patent Office 3,233,329
Patented Feb. 8, 1966

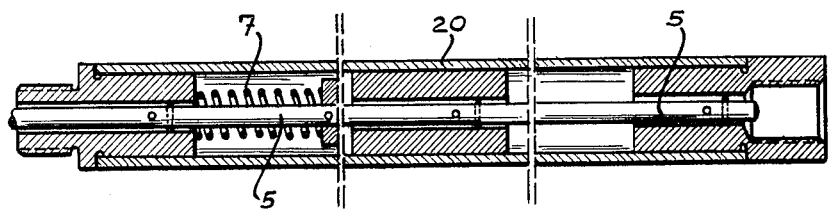
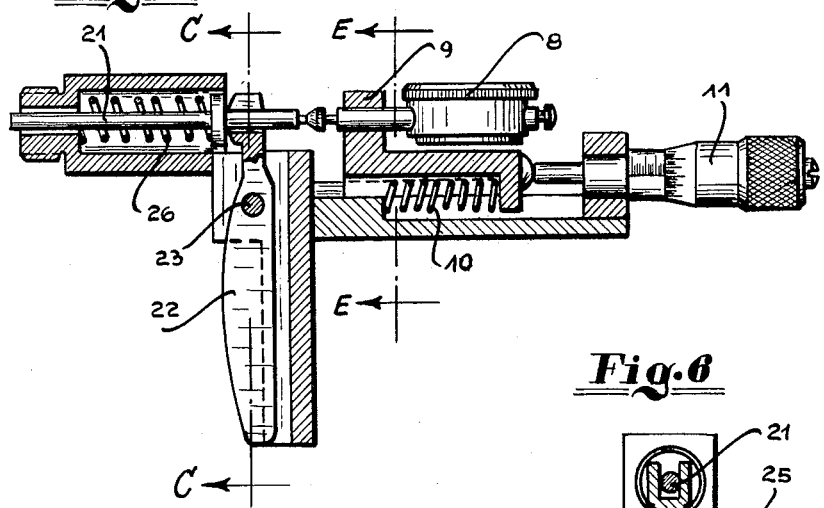
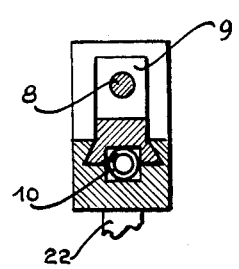
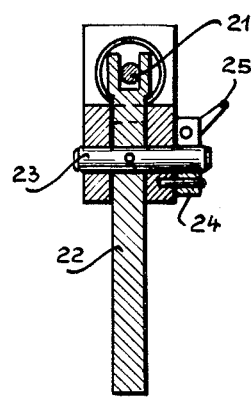

3,233,329
INSTRUMENT FOR THE MEASURING OF
INSIDE DIAMETERS
Hans Richter, Meppen, Ems, Germany, assignor to Hommelwerke G.m.b.H., Mannheim-Kafertal, Germany
Filed Oct. 29, 1963, Ser. No. 319,751
Claims priority, application Germany, Oct. 30, 1962,
H 47,264
21 Claims. (Cl. 33—147)

This invention relates to instruments for the measuring of inside diameters.

Inside diameters of bores are generally measured with the aid of instruments which have two oppositely located measuring or test points. One of these two points is fixed on the body of the measuring instrument, the other one is the top or head of a measuring pin which is displaceable perpendicularly to the axis of the bore, i.e., in the direction of the diameter. In known measuring instruments, the motion of said measuring pin is turned through 90° by suitable means and is transmitted to a rod which moves in axial direction and the movement of which, outside the bore, is measured and indicated by some indicating instruments such as, for example, by a dial gauge.

The path or distance of the displaceable measuring pin, which can be utilized for measuring, is limited by the above-noted turning and by the measuring range of the indicating instrument. In order to be able to use such a measuring instrument for a larger diameter range, the fixed measuring point can be provided by interchangeable measuring pins of different lengths so that it is possible to reach the desired diameter by the use of measuring pins of different lengths. In this case, the instrument must be set at the respectively desired diameters by means of setting gauging rings, so that a large number of setting rings is required.

It is an object of the invention to provide an improved instrument for the measuring of inside diameters.

It is a further object of the invention to avoid the deficiencies of the prior art noted above.

It is still another object of the invention to provide an improved instrument for measuring inside diameters and characterized by the inclusion of a measuring section to which can be detachably affixed a centering section for centering the instrument within a bore, the inside diameter of which is to be measured.

Yet another object of the invention is to provide an improved instrument, the measuring section of which is adapted for adjustment.

Yet another object of the invention is to provide an improved instrument for measuring inside diameters characterized by the inclusion of an intermediate section which is replaceable and which is positioned between a gauge and that portion of the instrument effecting the measurement.

To achieve the above and other of the objectives, the invention contemplates the provision of an instrument defining a longitudinal axis and comprising plates displaceable in longitudinal direction with slides being operatively disposed relative to these plates and coupled thereto by means of coulisses having an angular relationship relative to the aforesaid longitudinal axis whereby a dimetral displacement of the slides in a bore, the diameter of which is to be measured, may be effected.

The apparatus of the invention is further characterized by the provision of measuring pieces on the above-noted slides, which measuring pieces extend in opposite directions from one another, there being provided a connecting rod coupled to the above-mentioned plates to displace the same and means to measure the displacement of the aforesaid rod.

A feature of the invention is the provision of a balanced lever for coupling the above-noted rod to the associated plates.

A further feature of the invention is the provision of a measuring means which is displaceable relative to the remainder of the instrument and which is effective to measure the displacement of the above-noted rod.

Still a further feature of the invention is the provision of a replaceable intermediate member which includes a rod extension adapted for being displaced by the above-noted rod, as will hereinafter be described in greater detail.

The invention, moreover, advantageously contemplates the provision of a handle or the like, capable of displacing the aforenoted extension and adapted to assume loads on the same and being further adapted for being locked in any desired position, as will hereinafter become apparent.

Yet another feature of the invention is the provision of detachable centering means adapted for centering the instrument in any bore, the inside diameter of which is to be measured.

The above and further objects and features as well as advantages of the invention, will become apparent from the following detailed description of a preferred embodiment thereof as illustrated in the accompanying drawing in which:

FIGURE 4 is a longitudinal sectional view of an intermediate section of the apparatus of the invention adapted to constitute an extension from the right-hand side of the section illustrated in FIG. 1;

FIGURE 5 is a longitudinal sectional view of a section of the apparatus adapted to constitute an extension from the right-hand section of the section illustrated in FIG. 4;

FIGURE 6 is a cross-sectional view taken along line C—C of FIG. 5;

FIGURE 7 is a cross-sectional view taken along line E—E of FIG. 5;

Figure 1:
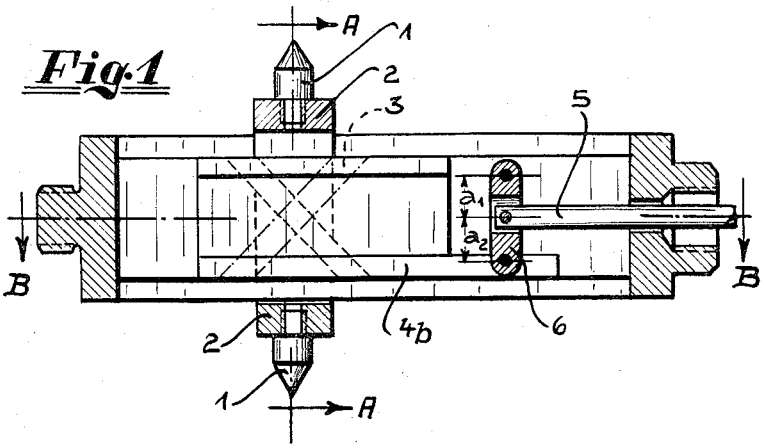
FIGURE 1 is a longitudinal sectional view of the section of an apparatus provided in accordance with a preferred embodiment of the invention, which section is adapted for sensing the inside diameter of a bore in a work piece.
Figure 2:
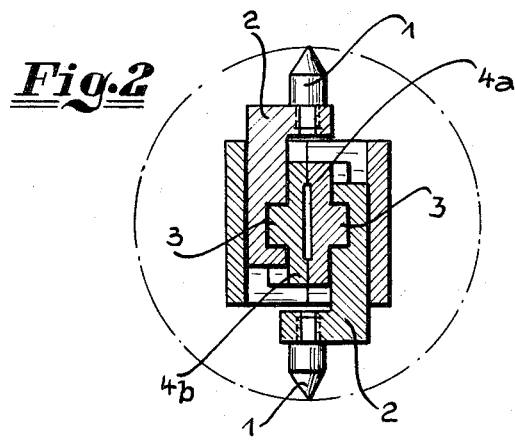
FIGURE 2 is a cross-sectional view taken along line A—A of FIG. 1.
Figure 3:
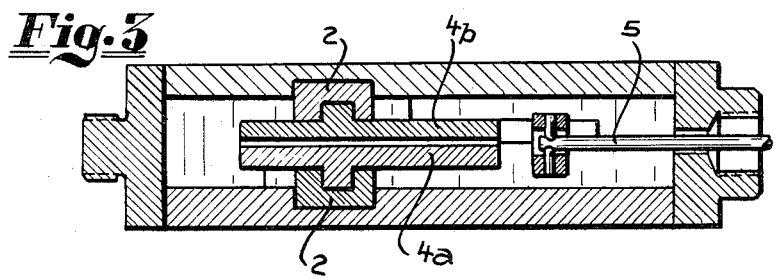
FIGURE 3 is a sectional view taken along line B—B of FIG. 1.

It is desirable and advantageous to have internal measuring instruments which can be used for a large diameter range and the setting of which requires only a single setting ring. The present invention solves this problem in the following manner:

Two diametrally opposite measuring pieces 1 are each mounted on a slide 2 which is connected by a coulisse (groove or slideway and sliding block) 3 to a plate 4a or b displaceable in axial direction in the bore to be measured, FIGS. 1–3. The two plates 4a and b have oppositely running coulisses which extend, preferably at an angle of 45°, to the axis of the bore and are displaced by means of a connecting or tension rod 5 through the intermediary of a balancing or adjusting lever 6 until the two measuring pieces 1 engage the wall of the bore.

The balancing lever makes it possible for the two measuring pieces to execute displacement paths of different lengths as is, for example, necessary if the wall of the bore comprises a unilateral recess, which causes the measuring pieces to occupy an asymmetrical position with respect to the axis of the bore. The lever ratio $a_1/a_2$ of the balancing lever 6 from the points of application at the plates 4 to the point of application of the connecting rod 5 is 1:1 so that, for example, with the plate 4*b* being held in position a pull of the connecting rod 5 by 1 mm. will cause the plate 4*a* to move a distance of 2 mm.

The displacement of the connecting rod 5 and hence, of the plates 4 is transmitted to a measuring gauge 8 which has a measuring range of 10 mm., FIGS. 4 and 5. In order to increase its measuring range, said measuring gauge 8 is put on a slide or carriage 9, which can be displaced by a micrometer 11 against the force of the spring 10. If a normal micrometer with a measuring range of 25 mm. is used, the total measuring range for the displacement path of the connecting rod 5 will be 10+25=35 mm. which makes it possible to measure a diameter range of 70 mm., for example, bores having a diameter from 70 to 140 mm., without it being necessary to exchange the measuring pieces 1. A single exchange of the measuring pieces permits increasing the measuring range by another 70 mm., i.e., for example, from 140 to 210 mm. diameter.

The spring 7 in FIG. 4 always exerts through the connecting rod 5 a pull on the plates 4 (FIG. 1), whereby the length of the spring 7 is regulated in such a manner that the elastic force is approximately the same over the entire displacement path of the connecting rod 5. The length of the intermediate member or spacer 20 in FIG. 4 depends on the length of the bore to be measured and is provided with a scale which permits measuring in cm. or mm. divisions, the distance of the measuring pieces 1 along the bore from a reference edge such as, for example, the front of the work piece. In this case a stop (not shown) with a vernier facilitates the insertion to predetermined depths to be measured.

The tension or connecting rod 5 presses, by way of the pin or stud 21 on the lever 22 (FIG. 5) which is bolted to the axle pin 23. By means of a clamping sleeve 24 which can be clamped with the lever 25 on the axle pin 23, it is possible to fix the lever 22 and thereby the entire measuring system so that the measuring gauge can be relieved of the load when no measurement is being carried out.

A motion against the force of the springs 7 and 26 can be effected manually by means of the lever 22 whereby the measuring pieces 1 are drawn inwardly and removed from the wall of the bore. The lever 22 can be fixed in any position desired within its range of motion by means of the clamping sleeve 24. A damping of the measuring motion of the entire system can be obtained by adjusting the clamping force to different strengths by means of the lever 25. This effect can also be obtained by other shock-absorbing means. A dependable repeatable measurement requires a constant measuring force and a uniform engagement or lay-on speed. This is insured by the above-provided springs and the shock-absorbing means.

Figure 8:
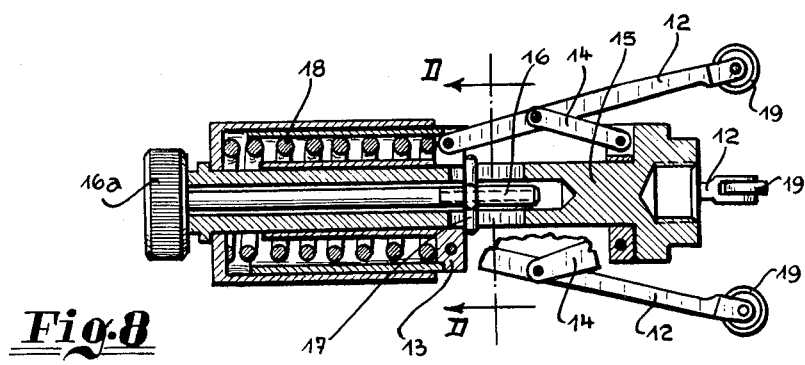
FIGURE 8 is a longitudinal cross-sectional view of the centering section of the apparatus of the invention adapted to be connected to the left-hand side of the apparatus illustrated in FIG. 1.
Figure 9:
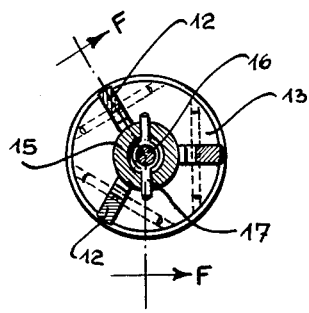
FIGURE 9 is a cross-sectional view taken along line D—D of FIG. 8.
Figure 10:
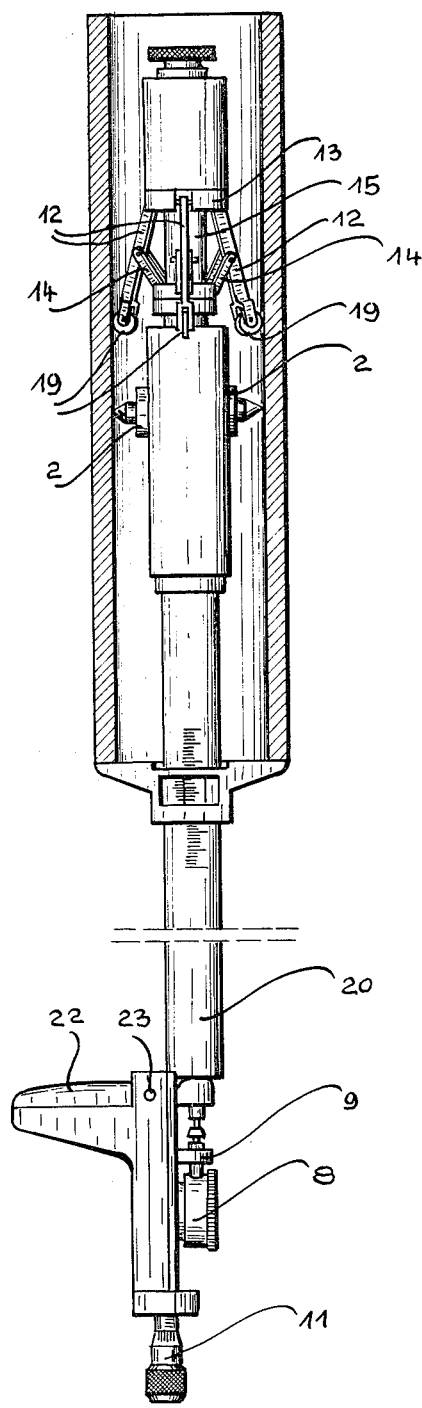
FIGURE 10 is a perspective view illustrating the various sections of the apparatus as connected to effect a measuring operation.

In order to align the sensing head with its two measuring pieces in a bore of any shape whatsoever, for example, a cone, in such a manner that the connecting line of the measuring points passes through the center of the bore, it is advantageous to provide a centering head (FIGS. 8 and 9), which comprises at least three centering arms 12. The latter are articulately fixed in tripod arrangement on a movable sleeve 13 and are connected to the main body 15 of the centering head by guide levers 14. The nut 17 which determines the position of the movable sleeve 13 and, thereby, the position of the centering arms, is displaced by turning the threaded spindle 16.

The spring 18 causes the centering arms to engage elastically the wall of the bore when the nut 17 is displaced to such an extent that it is removed from engagement with the movable sleeve 13. Rotatable convex rollers 19 are arranged on the free ends of the centering arms so that the centering head can be displaced readily in the bore.

Screwed on the sensing head (FIGS. 1–3) are, on the left side (FIGS. 8 and 9) the centering head, on the right side the measuring device (FIGS. 5, 6 and 7) and therebetween the intermediate member (FIG. 4). The measuring pieces 1 must be selected according to the diameter to be measured and put into the slide 2. The measuring gauge 8 is displaced by means of the micrometer 11 to such an extent that the result can be read off. The centering device is so set by means of the spindle 16, which is operated by means of its knurled knob 16*a*, that the rollers 19 elastically engage the wall of the bore of the test piece. By means of the handle 22, the slides 2 are drawn back, whereupon the entire instrument is displaced in axial direction, until the measuring head reaches that place of the bore which is to be measured. If the handle is then released, the measuring pieces 1 are caused to engage the wall of the bore by the action of the spring 7 and it is then possible to read on the dial gauge 8 the deviations from the set.

The setting at a specific measurement can be effected by means of setting rings. In each particular case, a single setting ring is sufficient for the entire measuring range.

What is claimed is:

1. Apparatus for measuring the inside diameter of a bore in a body, said apparatus having a longitudinal axis and comprising plates independently displaceable along said longitudinal axis and in an axial direction in said bore, slides operatively disposed relative to said plates, coulisses coupling said slides to said plates and having an angular relationhip thereto whereby a diametral displacement of the slides in the bore may be effected, measuring pieces on said slides and extending in opposite directions from one another, a connecting rod coupled to said plates to displace the same, and means to measure the displacement of said rod; and a balancing lever coupling said rod to said plates.

2. Apparatus as claimed in claim 1 wherein the said lever has a lever arm ratio from the rod to respective of said plates of 1:1 and said coulisses are at an angle of 45° to said longitudinal axis.

3. Apparatus for measuring the inside diameter of a bore consisting of a body, slides movable in said body and guided in said body in radial direction, measuring pieces fixed to said slides, coulisses disposed in said slides in opposed relationship, means engaging said slides, a measurement indicator means, and a rod connected to said measurement indicator means and to the first said means for imparting an axial movement thereto, a pair of said slides being disposed oppositely to each other, the first said means being a pair of plates engaging the coulisses for independent axial motion controlled by said rod.

4. Apparatus as claimed in claim 3 comprising a balancing lever coupling said rod to said plates.

5. Apparatus as claimed in claim 4 wherein the said lever has a lever arm ratio from the rod to respective of said plates of 1:1 and said coulisses are at an angle of 45° to said longitudinal axis.

6. Apparatus as claimed in claim 3 wherein said measuring indicator means is a dial gauge.

7. Apparatus as claimed in claim 3 comprising a replaceable intermediate member between said measurement indicator means and rod and including a rod extension adapted for being displaced by said rod.

8. Apparatus as claimed in claim 7 wherein said intermediate member includes a tubular element housing said rod extension.

9. Apparatus as claimed in claim 8 wherein said tubular element is provided with an index.

10. Apparatus as claimed in claim 8 comprising a spring in the tubular element resisting movement of the extension, a handle, and means pivotally supporting said handle on the tubular element with the handle axially engaging said extension for displacement of the latter.

11. Apparatus as claimed in claim 10 comprising means to lock the handle in fixed position.

12. Apparatus as claimed in claim 3 comprising a support in which said plates are displaceable and through which said rod extends, said measurement indicator means including a measuring means displaceably mounted on said support in a position to measure movement of said rod.

13. Apparatus as claimed in claim 12 including a slide supporting the measuring means on said support and a micrometer to displace the measuring means on said slide and measure the displacement thereof.

14. Apparatus as claimed in claim 12 comprising centering means fixed on said support and adapted to center the latter in said bore.

15. Apparatus as claimed in claim 14 wherein said centering means comprises a plurality of centering arms distributed about said longitudinal axis, and a centering head pivotably supporting the arms.

16. Apparatus as claimed in claim 15 wherein the centering means includes a main body supporting the head and guide levers coupling the arms pivotally to the latter said body.

17. Apparatus as claimed in claim 16 comprising a spindle operatively coupled to the arms to spread the same.

18. Apparatus as claimed in claim 17 comprising convex rollers on the arms.

19. For use with an inside diameter measuring device: centering apparatus comprising a support selectively connectable to said device, a tripod arrangement of pivotal levers spaced around said support, further levers piovted to the first said levers, relatively displaceable elements coupled respectively to the first said levers and to said further levers for the adjustment of said tripod arrangement, and means for controlling the relative displacement of said displaceable elements.

20. Apparatus as claimed in claim 19, wherein the first said levers have free extremities, comprising convex rollers mounted on said extremities.

21. Apparatus as claimed in claim 20 comprising locking means for locking said displaceable elements together.

References Cited by the Examiner

UNITED STATES PATENTS

| 2,030,244 | 2/1936 | Cox | 33—78 |
|---|---|---|---|
| 2,207,625 | 7/1940 | Lester | 33—170 |
| 2,312,222 | 2/1943 | Tanner | 33—178 |
| 2,553,350 | 5/1951 | Bayhi. | |

FOREIGN PATENTS

| 336,996 | 5/1921 | Germany. |
|---|---|---|
| 745,882 | 5/1944 | Germany. |

ISAAC LISANN, *Primary Examiner.*

WILLIAM K. QUARLES, JR., *Assistant Examiner.*